No. 715,843. Patented Dec. 16, 1902.
D. F. McLENNAN.
CATTLE STANCHION.
(Application filed Sept. 20, 1901.)
(No Model.)

WITNESSES:
E. L. Benson
H. E. Arthur

INVENTOR
Donald F. McLennan
BY
Smith & Davidson
ATTORNEYS.

UNITED STATES PATENT OFFICE.

DONALD F. McLENNAN, OF SYRACUSE, NEW YORK.

CATTLE-STANCHION.

SPECIFICATION forming part of Letters Patent No. 715,843, dated December 16, 1902.

Application filed September 20, 1901. Serial No. 75,851. (No model.)

*To all whom it may concern:*

Be it known that I, DONALD F. MCLENNAN, of Syracuse, in the county of Onondaga, in the State of New York, have invented new and useful Improvements in Cattle-Stanchions, of which the following, taken in connection with the accompanying drawings, is a full, clear, and exact description.

This invention relates to improvements in cattle-stanchions.

My object is to improve the detail construction thereof so that the animal will be enabled to move forward and backward within certain limitations and also allow it to swing the head around toward the body; and to that end my invention consists in the several new and novel features of construction and operation which are hereinafter fully described, and specifically set forth in the claims hereto annexed.

The construction is as follows, reference being had to the accompanying drawings, in which—

Figure 1:
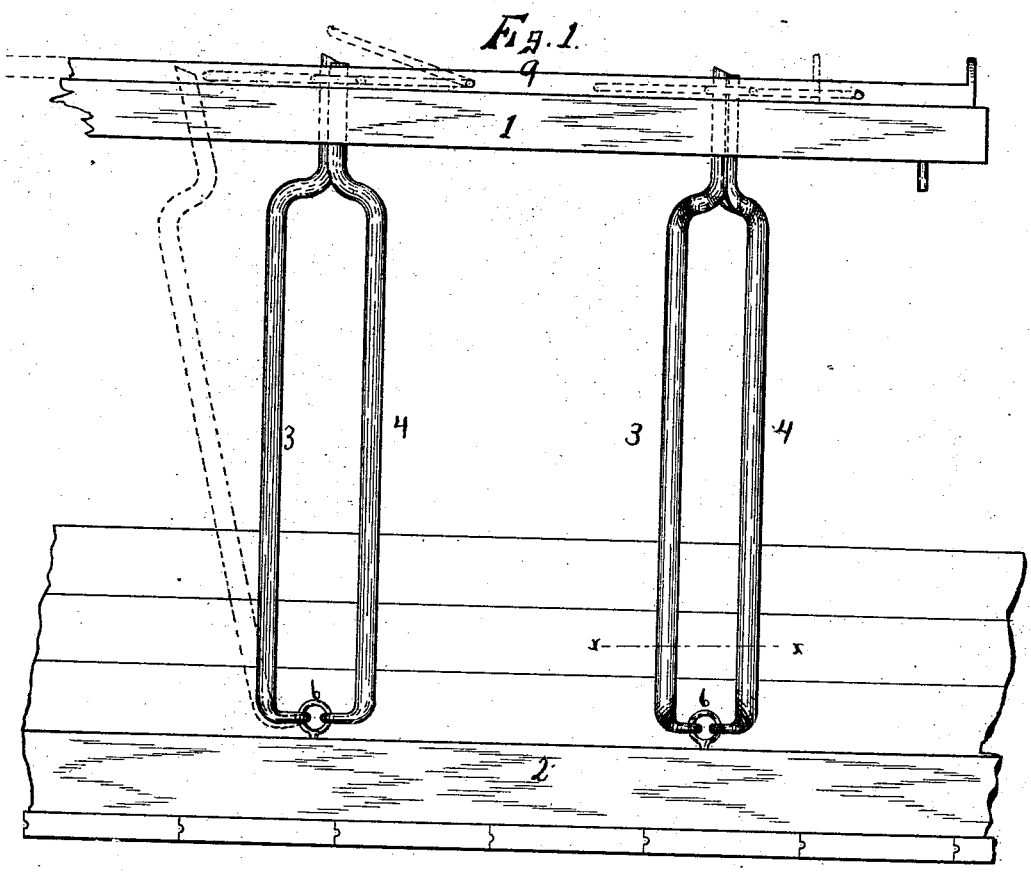
Figure 2:
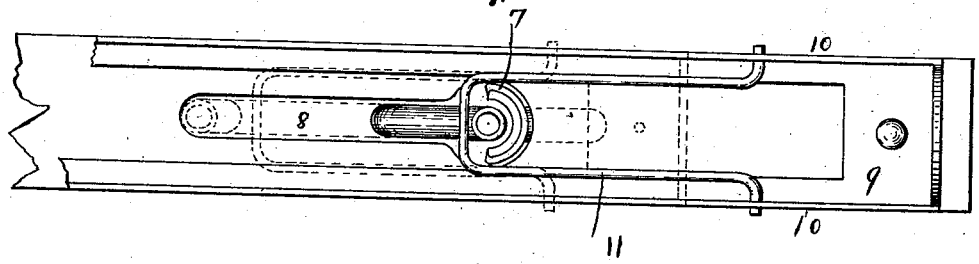
Figure 3:
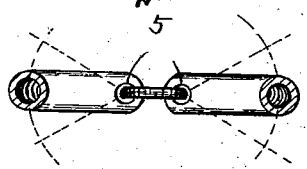

Figure 1 shows a side view of the stanchion in operation and some of the parts in dotted lines. Fig. 2 is a top plan view of the right-hand half of Fig. 1. Fig. 3 is a cross-section, enlarged, on line $x\ x$ of Fig. 1.

My improved stanchion is mounted between an upper bar 1 and a lower bar or framework 2.

3 and 4 are vertically-arranged bars, their lower ends extending inwardly, as shown, and provided with eyes 5 in said ends, engaging with the eye 6, secured in the lower bar 2, thereby forming a hinge connection. The upper ends of said bars approach each other, the bar 4 having the inner face constructed concave, as shown at 7, and the upper end of the bar 3 adapted to rest in the cavity, as shown in Figs. 1 and 2 of the drawings. It will thus be observed that the bars 3 and 4, which embrace the neck of the animal, will each be allowed to describe a portion of a circle, as indicated by dotted lines in Fig. 3, so that the animal will be able to move forward and backward and at the same time thrust the head around to either side.

In the upper bar 1 is a slot 8 of uniform width, except the end in which is the concaved end 7 of the bar 4, this being enlarged to retain the upper end of the bar 4, so as to always hold said bar in a vertical position and not allow it to drop down to a position of the bar 3 indicated by dotted lines in Fig. 1.

Upon the bar 1 is mounted a frame 9, having an upturned edge 10, in which at regular intervals are mounted bails 11, each of which is adapted to engage with the upper end of a bar 3, so as to hold it in engagement with the concave end 7 of the bar 4, thereby locking them together when in use. This bracket or frame 9 is adapted to slide longitudinally on the bar 1, so that when desired all of the stanchions may be unlocked by moving the bails to the position shown by dotted lines Fig. 2, or they may be all locked together. In the event, however, of my desiring to keep any one or more of the stanchions from being unlocked, I provide a ring, which I throw over the top of the upper end of the bars 3 and 4, or I may provide a pin, which shall hold them in engagement.

Having described my invention, what I now claim, and desire to secure by Letters Patent, is—

1. An animal-stanchion comprising separate upright bars swivel-supported at one end, and swinging horizontally independently of each other, one end of one of the bars being seated in the adjacent end of the other bar and having independent movement toward and away from the other bar, and sliding means for effecting said independent movement in one direction.

2. An animal-stanchion comprising lower and upper supports, separate upright bars rocking horizontally independently of each other and having offset ends pivotally secured to the supports, the upper end of one of the bars having an open-sided bearing for the adjacent end of the other bar, the said adjacent end having an independent lateral movement toward and away from said bearing for the purpose described.

3. An animal-stanchion comprising lower and upper supports, separate upright bars having offset ends pivotally secured to the supports, said bars rocking horizontally independently of each other, the upper end of one of the bars having an open-sided bearing for the adjacent end of the other bar, said adjacent end having an independent movement toward and away from said bearing for locking and releasing the animal, and a sliding member on the upper support having means for engaging and moving the said adjacent end toward said bearing.

4. An animal-stanchion comprising lower and upper supports, separate upright bars having offset ends pivotally secured to the supports, said bars having independent horizontal rocking movement, the upper end of one of the bars having an open-sided bearing for the adjacent end of the other bar, said adjacent end having an independent movement toward and away from said bearing for the purpose described, a sliding member on the upper support and a hinged member on the sliding member controlling the movement of said adjacent end.

In witness whereof I have hereunto set my hand on this 6th day of September, 1901.

DONALD F. McLENNAN.

Witnesses:
  HOWARD P. DENISON,
  JESSIE M. HAMMEKEN.